United States Patent
Asaad et al.

(10) Patent No.: US 6,754,761 B1
(45) Date of Patent: Jun. 22, 2004

(54) COMMUNICATIONS SYSTEM INCLUDING SYMMETRIC BUS BRIDGE AND METHOD USED THEREWITH

(75) Inventors: Sameh W. Asaad, Mahopac, NY (US); Kevin W. Warren, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 09/633,856

(22) Filed: Aug. 7, 2000

(51) Int. Cl.[7] ............................. G06F 13/36; G06F 9/54
(52) U.S. Cl. ..................... 710/311; 710/314; 709/310
(58) Field of Search .................................. 710/302, 304, 710/109, 314, 311; 709/213, 209, 310; 713/1; 714/768; 455/12.1; 326/57; 370/230; 711/5; 345/532

(56) References Cited

U.S. PATENT DOCUMENTS

| | | | | | |
|---|---|---|---|---|---|
| 4,318,175 A | * | 3/1982 | Hawley | ........................... | 711/5 |
| 4,698,753 A | * | 10/1987 | Hubbins et al. | ............. | 709/209 |
| 5,717,891 A | * | 2/1998 | Potts et al. | ................... | 711/125 |
| 5,734,847 A | * | 3/1998 | Garbus et al. | ............... | 710/314 |
| 5,898,668 A | * | 4/1999 | Shaffer | ........................ | 370/230 |
| 5,978,953 A | * | 11/1999 | Olarig | ......................... | 714/768 |
| 6,052,133 A | * | 4/2000 | Kang | ........................... | 345/532 |
| 6,070,207 A | * | 5/2000 | Bell | ............................. | 710/302 |
| 6,070,214 A | | 5/2000 | Ahern | | |
| 6,154,836 A | * | 11/2000 | Dawson et al. | ................. | 713/1 |
| 6,161,157 A | * | 12/2000 | Tripathi et al. | .............. | 710/109 |
| 6,177,808 B1 | * | 1/2001 | Heinrich et al. | ............... | 326/57 |
| 6,192,397 B1 | * | 2/2001 | Thompson | ................... | 709/209 |
| 6,266,770 B1 | * | 7/2001 | Porterfield | ...................... | 713/1 |
| 6,275,677 B1 | * | 8/2001 | Tandler | ...................... | 455/12.1 |
| 6,457,091 B1 | * | 9/2002 | Lange et al. | ................. | 710/314 |
| 6,460,106 B1 | * | 10/2002 | Stufflebeam | ................ | 710/304 |
| 6,473,789 B1 | * | 10/2002 | Chen et al. | .................. | 709/213 |

* cited by examiner

*Primary Examiner*—Glenn A. Auve
*Assistant Examiner*—Christopher E. Lee
(74) *Attorney, Agent, or Firm*—Richard M. Ludwin, Esq.; McGinn & Gibb, PLLC

(57) ABSTRACT

A method of (and system for) of transporting a sideband signal through a physical layer of an extended bridge, includes on a first node of the extended bridge, providing an interface to a sideband component coupled to a side of the extended bridge, encoding a first data stream being output from the sideband component with a unique header to identify the data output from the sideband component, and multiplexing the first data stream from the sideband component with a second data stream from a principal signal port, and outputting the multiplexed first and second data streams to another node of the extended bridge.

39 Claims, 5 Drawing Sheets

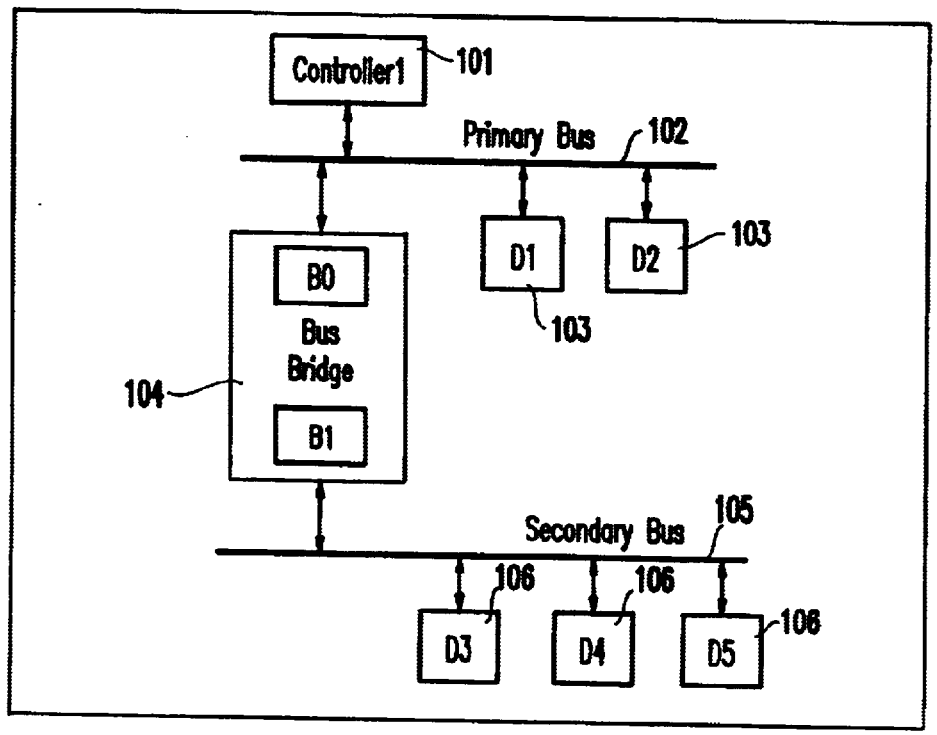
(PRIOR ART) FIG.1
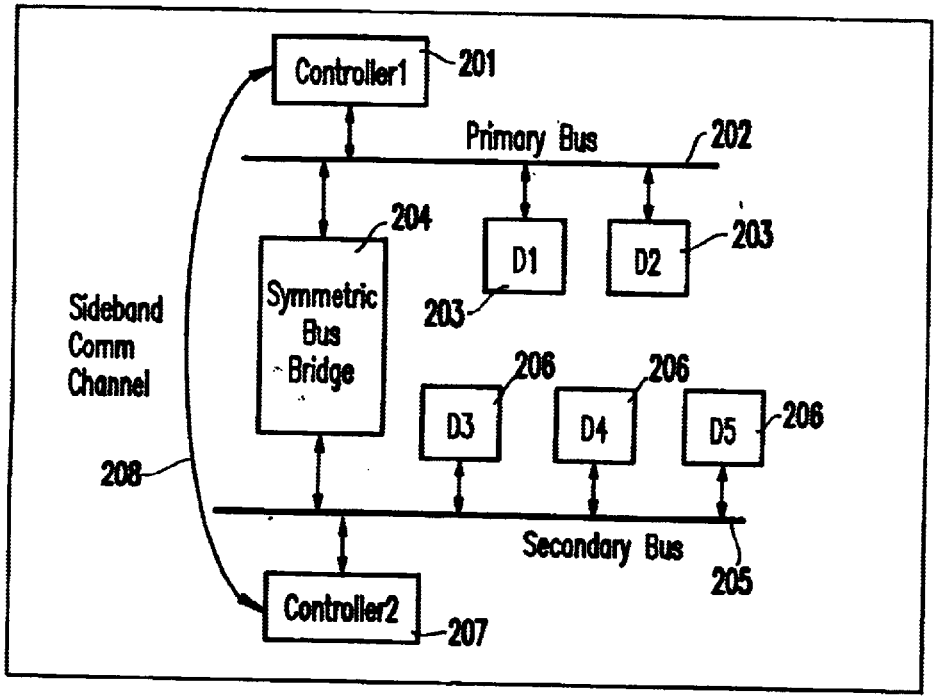
FIG.2

COMMUNICATIONS SYSTEM INCLUDING SYMMETRIC BUS BRIDGE AND METHOD USED THEREWITH

CROSS-REFERENCE TO RELATED APPLICATIONS

The present application relates to U.S. patent application Ser. No. 09/633,806, filed on Aug. 7, 2000, to Sameh Asaad et al., entitled "METHOD AND SYSTEM FOR HIGH RESOLUTION DISPLAY CONNECT THROUGH EXTENDED BRIDGE", and to U.S. patent application Ser. No. 09/633,825, filed on Aug. 7, 2000, to Sameh Asaad et al., entitled "METHOD AND SYSTEM FOR TRANSPORTING SIDEBAND SIGNALS THROUGH PHYSICAL LAYER OF EXTENDED BRIDGE", and to U.S. patent application Ser. No. 09/633,876, filed on Aug. 7, 2000, to Sarneh Asaad et al., entitled "ALL-IN-ONE MOBILE DOCKING STATION AND SYSTEM USED THEREWITH", and to U.S. patent application Ser. No. 09/633,826, filed on Aug. 7, 2000, to Sameh Asaad, et al., entitled "SYSTEM AND INTELLIGENT DOCK USING A SYMMETRIC EXTENDED BUS BRIDGE AND METHOD THEREFOR", each of which is incorporated herein by reference.

BACKGROUND OF THE INVENTION

1. Field of the Invention

The present invention relates to a communications system, and more particularly to a symmetric bus bridge whose primary and secondary interfaces are separated and in which the role of the primary and secondary interface can be switched under software/application control (thereby providing the symmetry).

2. Description of the Related Art

FIG. 1 illustrates a generic bus architecture for a conventional system. That is, FIG. 1 shows a system 100 with a typical bus bridge.

System 100 includes a controller 101 (e.g., CPU), a primary bus 102 connecting the controller to one or more devices 103 (e.g., D1, D2, etc.), a bus bridge 104 connecting the primary bus to a secondary bus 105 and one or more devices 106 (e.g., D3, D4, D5, etc. which may be similar or different from those of devices 103) connected to the secondary bus 105.

During system configuration, the bus bridge 104 is responsible for storing and forwarding configuration information from the controller 101 to devices 106 connected to the secondary bus 105. The bus bridge 104 has an interface B0 to the primary bus 102 and an interface B1 to the secondary bus 105.

The configuration process includes bus numbering, device discovery, and resource allocation (e.g., memory space, IO space, interrupts, etc.) to each of the devices 106 as per device request. After configuration is complete, devices 106 connected to the secondary bus 105 (e.g., behind the bus bridge), appear in the memory map and/or IO map of the controller 101 in the same way as devices 103 connected to the primary bus 102.

The bridge 104 stores all the pertinent information in its internal configuration register space, which is accessed by the controller 101 during the configuration process. The information stored in the configuration registers is also used regularly at runtime by the bus bridge 104 to decide when to claim transactions originating at one bus and forward it to the other bus. It is noted that only the primary bus interface is allowed to read from/write to the configuration register space of the bus bridge.

In a typical communications environment (e.g., a single bus), a device wishing to communicate by either reading data from or writing data to another device on the bus 102 generally performs the following steps.

That is, for Dx (e.g., one of D1, D2, etc.) reads from Dy (another of devices D1, D2, etc.), first Dx arbitrates for bus ownership.

When granted, Dx takes control of the bus and asserts the address of the destination device (Dy) as well as the transaction type it wishes to perform (e.g., read). The transaction may also need to be qualified by other parameters (e.g., memory versus input/output (I/O) read, (starting) address read transaction, single read versus burst mode read, and the number of data elements to read in case of a burst read mode).

All other devices decode the information asserted by the originating device Dx. The addressed device, Dy, responds by acknowledging the transaction.

When Dx sees the acknowledge, it has to relinquish control of the data portion of the bus to enable the target device, Dy, to transmit the requested data. The mechanism of turning the direction of data flow over the bus is implementation specific and may vary from one architecture to another.

Thereafter, Dy transmits the required data element(s) over the bus. Dy could optionally stall the bus until it is ready to transmit the data.

When the required data element(s) is(are) transmitted over the bus, both Dx and Dy relinquish the bus so that it is ready for a new transaction.

For Dx writing to Dy, first Dx arbitrates for bus ownership.

When granted, Dx takes control of the bus and asserts the address of the destination device (Dy) as well as the transaction type it wishes to perform (write). The transaction also may need to be qualified by other parameters (e.g., memory versus I/O write, (starting) address write transaction, (starting) data element, single write versus burst mode write, and the number of data elements to write in case of a burst write mode).

All other devices decode the information asserted by the originating device Dx. The addressed device, Dy, responds by acknowledging the transaction.

When Dx sees the acknowledge, it transmits the desired data element(s) to Dy. Dy could optionally stall the bus until it is ready to receive the data.

When the required data element(s) is (are) transmitted over the bus, Dx releases the bus such that it is ready for a new transaction.

However, as shown in FIG. 1, communications can be performed across a so-called "bus bridge" 104. That is, two busses 102, 105 can be linked together using the bus bridge 104. Devices connect to different busses can communicate with each other through the bus bridge. For the purposes of the following discussion, it is assumed that Dx resides at Bus 102 and Dy at Bus 105.

In contrast to the operations discussed above, for Dx reads from Dy, first Dx arbitrates for Bus 102 ownership.

When granted, Dx takes control of the bus and asserts the address of the destination device (Dy) as well as the transaction type it wishes to perform (e.g., read). The transaction may also need to be qualified by other parameters (e.g. memory versus I/O read, (starting) address. read transaction, single versus burst mode read, and the number of data elements to read in case of a burst read mode).

All other devices decode the information asserted by the originating device Dx. Since Dy resides on Bus 105, B0 responds on behalf of Dy by acknowledging the transaction.

When Dx sees the acknowledge, it has to relinquish control of the data portion of the bus to enable the target device, B0, to transmit the requested data. The mechanism of turning the direction of data flow over the bus is implementation specific and may vary from one architecture to another.

B0 stalls Bus 102 until it fetches the requested data from Dy across the bridge.

While stalling Bus 102, B0 transmits a request packet across its communications link to the receiving bridge connected to Bus 105, namely B1.

Upon receiving the request, B1 will read the requested data from Dy. This is achieved by following the steps of "Dx reads from Dy" scenario described above in the above-described first case, but replacing Dx by B1.

When the read transaction on Bus B is completed, B1 will packetize the data and transmit back across the communications link to B0.

Then, B0 starts transmitting the data to Dx. When the required data element(s) is(are) transmitted over the bus, both Dx and B0 relinquish Bus 102 so that it is ready for a new transaction.

Regarding Dx writes to Dy, first Dx arbitrates for Bus 102 ownership.

When granted, Dx takes control of the bus and asserts the address of the destination device (Dy) as well as the transaction type it wishes to perform (e.g., write). The transaction may also need to be qualified by other parameters (e.g., memory versus IO write, (starting) address write transaction, (starting) data element, single versus burst mode write, and the number of data elements to write in case of a burst write mode).

All other devices on Bus 102 decode the information asserted by the originating device Dx. Since Dy resides on Bus B, B0 responds on behalf of Dy by acknowledging the transaction.

When Dx sees the acknowledge, it transmits the desired data element(s) to B0. B0 accepts the data, then stalls the bus until it has completed the transaction on the remote side (i.e., Bus 105). Alternatively, B0 might release the bus, but not respond to any more transactions until it has completed the current transaction on the remote side.

B0 transmits a data packet across its communications link to the receiving bridge connected to Bus 105, namely B1.

Upon receiving the data packet, B1 will write the data to Dy. This is achieved by following the steps of "Dx writes to Dy" scenario described above in the above-described first case, but replacing Dx by B1.

When the write transaction on Bus 105 is completed, B1 will transmit an acknowledge packet back across the communications link to B0 to signal the completion of the transaction of bus 105.

B0 now releases the stalled bus, possibly giving a positive acknowledge to Dx to inform it that the transaction has successfully completed. (Alternatively, B0 will now start accepting new transactions destined to devices across the bridge). Then, Dx releases Bus 102 so that it is ready for a new transaction.

However, the conventional system of FIG. 1 is deficient since it has a fixed architecture in defining the primary bus interface and the secondary bus interface. Thus, it is impossible to switch the roles of the primary and secondary interfaces after system design, and thus the flow of control across the bridge, with respect to system configuration, is fixed.

SUMMARY OF THE INVENTION

In view of the foregoing problems, drawbacks, and disadvantages of the conventional systems, it is an object of the present invention to provide a structure (and method) in which the roles of primary and secondary bus interfaces can be switched selectively.

In a first aspect, in a system that includes a controller, a plurality of busses coupled to the controller, a plurality of devices coupled to the busses, and at least one bus bridge coupling at least two busses of the plurality of busses, wherein the bus bridge includes at least two interfaces each providing an interface to a different one of the two busses coupled thereto, and wherein the controller executes a configuration routine to configure the system, a method for initializing the bus bridge includes providing memory storing configuration information used in conjunction with the configuration routine, selecting an arbitrary one of the two interfaces of the bus bridge based upon a control signal, and enabling access to the memory by the selected one of the interfaces of the bus bridge for use in conjunction with the configuration routine, and disabling access to the memory by the other one of the interfaces of the bus bridge.

In a second aspect, a communications system (and method therefor) includes first and second controllers communicatively coupled together, a plurality of busses respectively coupled to the controllers, a plurality of devices coupled to the busses, and at least one bus bridge coupling at least two busses of the plurality of busses.

In a third aspect, a method of resolving conflict between first and second busses of a plurality of busses in a communication system, includes establishing initial communication between the first and second busses, exchanging configuration information between the first and second busses, comparing a local side configuration to a remote side configuration, and determining whether the local side configuration is identical to the remote side configuration, and if so then raising a conflict flag to resolve the conflict.

Further, a signal-bearing medium (e.g., program storage device) is provided for storing the method(s) of the invention.

Thus, with the unique and unobvious features of the invention, a bus bridge is provided in which the role of the primary and secondary interface can be switched under software/application control (thereby providing the symmetry).

Further, the invention allows two computer systems, each with its own controller (CPU) and peripheral devices to be coupled through the symmetric bus bridge, one computer system on each side of the bridge, such that any controller (CPU) can become the "master" of the combined system taking over the peripheral devices originally associated with the other computer system across the symmetric bridge, mapping them to its own memory or IO space while the other computer system's controller (CPU) is disabled. Furthermore, the role of the master controller (CPU) can be switched on a session-by-session basis (hence the symmetry).

BRIEF DESCRIPTION OF THE DRAWINGS

The foregoing and other objects, aspects and advantages will be better understood from the following detailed description of a preferred embodiment of the invention with reference to the drawings, in which:

FIG. 1 illustrates a conventional system 100 having a typical bus bridge architecture;

FIG. 2 illustrates a system 200 according to a first preferred embodiment of the present invention including a symmetric bus bridge 204 for communications between a primary bus 202 and a secondary bus 205;

DETAILED DESCRIPTION OF PREFERRED EMBODIMENTS OF THE INVENTION

Figure 3A:
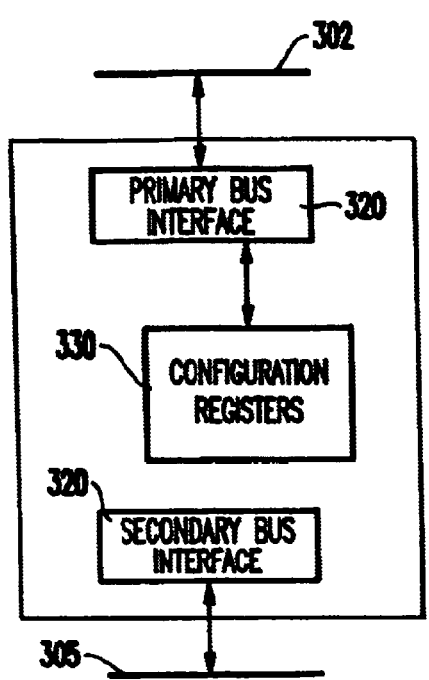
FIGS. 3A and 3B respectively illustrate an access to a configuration register space in a conventional bus bridge and a symmetric bus bridge according to the present invention.

Referring now to the drawings, and more particularly to FIGS. 2–8, there are shown preferred embodiments of the method and structures according to the present invention.

The exemplary circuit details included in the present invention for handling the different interfaces are described below. For this discussion, it is important to distinguish between the two sides of the bridge. In the present application, it is assumed that the side of the bridge closest to the processor is the "primary side" and the other side is called the "secondary side".

Generally, the invention operates by incorporating the union of both primary/secondary bus interfaces on the same side of the bridge. A primary chip input signal is routed to all sub-blocks and its value is used to determine which sub-blocks will be active on the primary side and which will be active on the secondary side. Sub-blocks that are common to both interfaces are enabled regardless of this mode input control signal.

Upon establishing communications between both sides of the bridge, automatic negotiation occurs to determine the configuration set on each side. A special status signal is raised if both sides are configured as a "primary", or both sides are configured as a "secondary side". This signal enables further, software-controlled, negotiation to occur to resolve the roles of the two bridge sides. Thus, a control signal (e.g., primary$_{13}$ bridge) is used as a mode selector on each side and can be controlled via software. A status signal (e.g., id$_{13}$ unresolved) is raised when both sides are configured to be the same interface, in which case further resolution is required by software intervention.

First Preferred Embodiment (Symmetric Bus Bridge Arrangement)

According to the present invention, the arrangement of FIG. 1 is extended to include a second controller 207 connected to the secondary bus 205, as shown in FIG. 2. The bus bridge 104 in the conventional arrangement of FIG. 1 is advantageously replaces by a symmetric bus bridge 204 which allows either a first controller 201 connected to a primary bus 202 (e.g., Controller 1) or the second controller 207 (Controller 2) to initiate and execute the configuration process, thereby taking control of all devices (e.g., devices 203, 206) in the system.

Thus, the role of primary bus interface and secondary bus interface within the bus bridge can be switched (hence, the term "symmetrical" being applied to the bridge).

It is assumed that both controllers 201, 207 will go through a negotiation phase, which may include communicating through a sideband communication channel 208, as illustrated in FIG. 2, to determine who will "win" (e.g., arbitrate) in controlling the devices in the system. After the negotiation phase, one controller (e.g., controller 201 or controller 207) will disconnect itself from the system (or perform other functions), while the other (the other of controller 207 or controller 201) will start a conventional system configuration phase, as explained above with regard to FIG. 1.

Figure 3B:
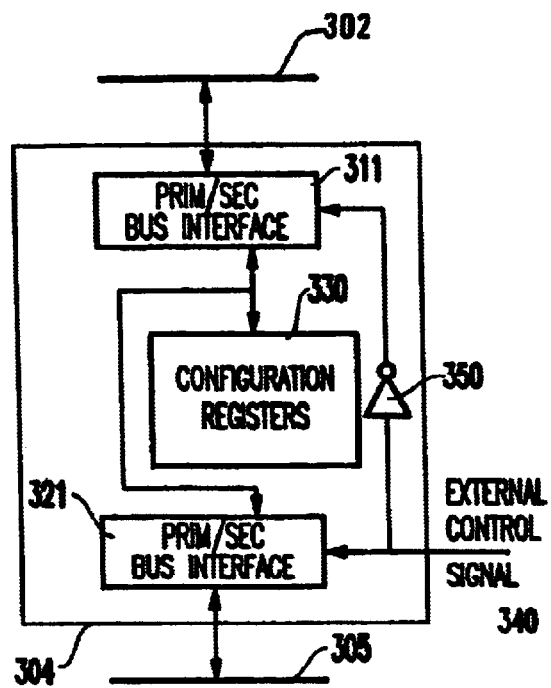

To enable this operation, the symmetric bus bridge provides a structure and method for switching its primary and secondary bus interfaces (e.g., shown in FIG. 3B and described below), so that the primary side can always be connected to the "winning" controller, thereby enabling it to access the configuration register space (e.g., shown in FIG. 3B).

The structure and method for switching the roles of primary and secondary bus interfaces is illustrated in FIG. 3B and is contrasted with the operation of FIG. 3A. That is, FIG. 3A illustrates an access to a configuration register space in a conventional bus bridge and FIG. 3B illustrates an access to a configuration register space in a symmetric bus bridge according to the present invention.

In the conventional bridge (e.g., 104 of FIG. 1), as shown in FIG. 3A, the interfaces 310, 320 to the primary side and secondary side busses 302, 305, respectively, are defined at design/manufacturing time and therefore cannot be changed in-system (e.g., selectively).

As mentioned above in the conventional bus bridge, only the primary side interface 310 has access to the configuration register space read/write port 330.

In contrast, in the symmetric bus bridge 304 (e.g., same as bridge 204 shown in FIG. 2), each bus interface 310, 320, respectively, is designed so it can selectively operate as a primary bus interface 310 or as a secondary bus interface 320 depending on the polarity of an external control signal 340. It is noted that the external control signal is preferably issued by the system CPU, but can also be issued by other hardware or software modules.

Thus, as shown in FIG. 3, first and second primary/secondary bus interfaces 311, 321, are provided which can allow controllers 201, 207 attached thereto, to access the internal configuration register space 330. To prevent both interfaces from accidentally accessing the configuration registers 330, one interface is always configured using the control signal, while the other is configured using its complement. Such a complement may be formed by an inverter 350 receiving the external control signal and inverting the control signal.

Thus, while a first interface is active, the second interface is guaranteed to be inactive since it receives the complement of the control signal 340 provided to the first interface.

The external control signal can be manipulated by external system logic to switch the bridge while in-system (i.e., after manufacturing). It is noted that the external control signal is also used to determine the direction of important IO signals in the bridge such as interrupts and sideband signals.

One of ordinary skill in the art would recognize that the present invention could be variously implemented. Thus, for example, each primary/secondary bus interface 311, 321 could be implemented such that the primary bus interface portion and the secondary bus interface portion are located together on the same chip.

Second Preferred Embodiment(Symmetric Extended Bus Bridge Arrangement)

Figure 4:
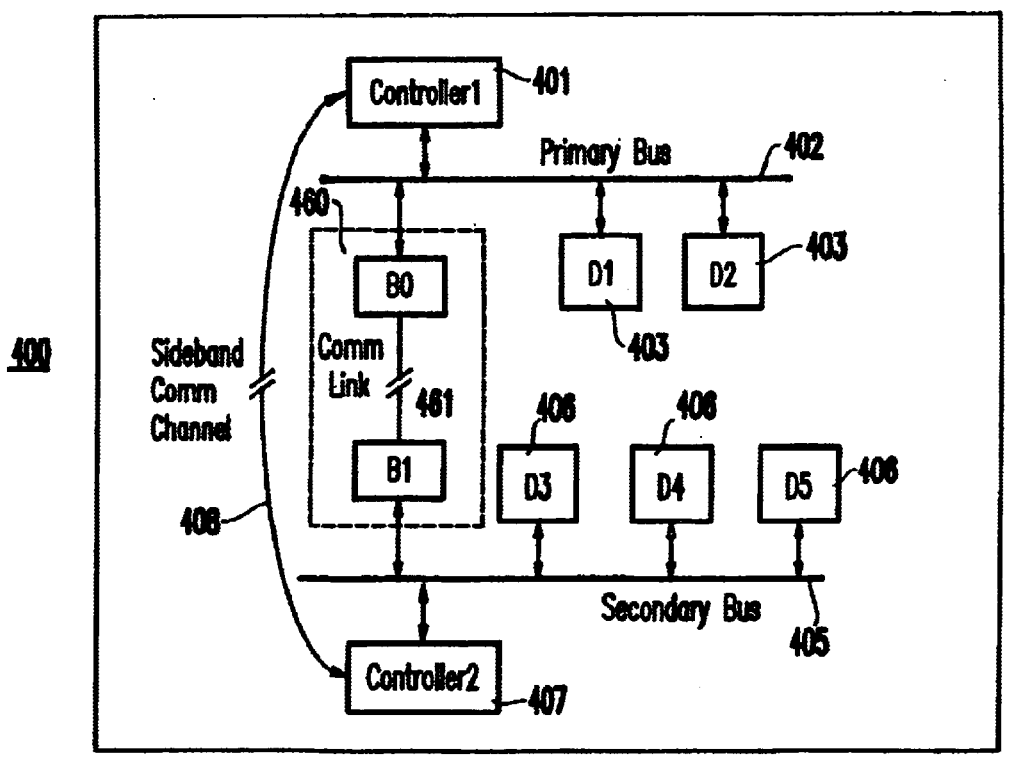
FIG. 4 illustrates a system 400 according to a second preferred embodiment of the present invention including a symmetric extended bus bridge 460.

As shown in FIG. 4, the present invention also provides an arrangement/system 400 incorporating a symmetric extend bus bridge arrangement 460. That is, the arrangement of FIG. 2 is further extended by considering a symmetric bus bridge that encompasses a communication medium 461 which can be wired, optical, etc. between its bus interfaces B0, B1, as shown in FIG. 4. Similar to FIG. 2, in FIG. 4 there is shown a first controller 401, a second controller 407, and a sideband communication channel 408.

An advantage of this arrangement is that the two busses 402, 405, respectively, and therefore the devices 403, 406 attached to the respective bus, are not required to be physically co-located in the same system anymore. They can be separated by a relatively long distance which is only limited by the capabilities of the communication medium used.

Figure 5:
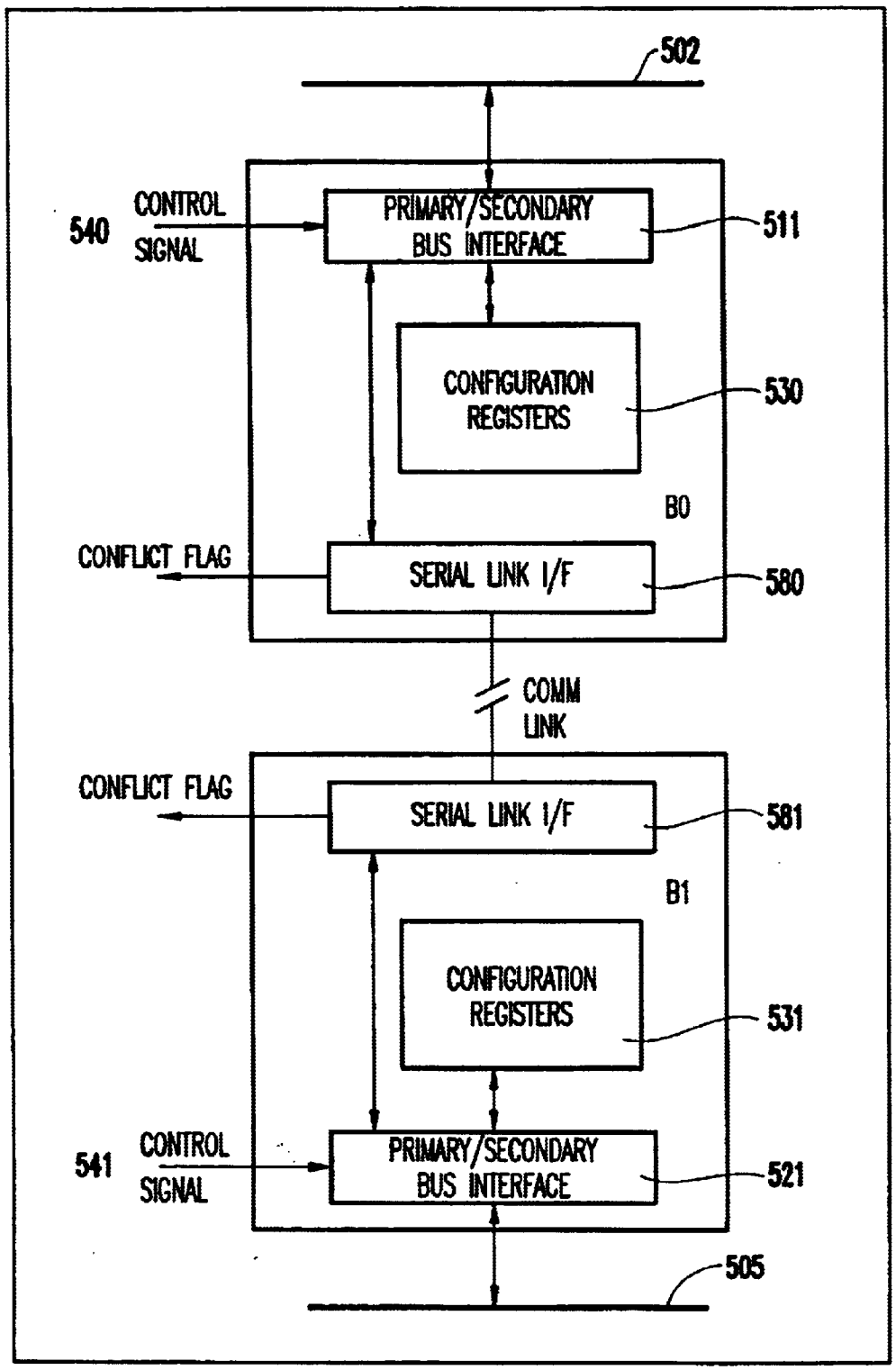
FIG. 5 illustrates access to configuration register space in the symmetric extended bus bridge 460.

To achieve this arrangement, the extended bus bridge 460 incorporates two identical copies of the configuration register space 530, 531, one on each side as shown in FIG. 5. The copies are kept in synchronism by writing to the remote side first, and then to the local side before acknowledging the configuration transaction. As shown in FIG. 5 the arrangement includes busses 502, 505; primary/secondary bus interfaces 511, 521; and configuration registers 530 and 531.

Moreover, the external control signal that determines which bus interface should be the primary bus interface and which should be the secondary is now split into two local control signals 540, 541, one on each side as illustrated in FIG. 5. Since the two control signals 540, 541 are now decoupled (e.g., as compared to the single control signal 340 shown in FIG. 3B), a potential conflict may arise if both sides try to become primary interfaces or both try to become secondary interfaces.

Figure 6:
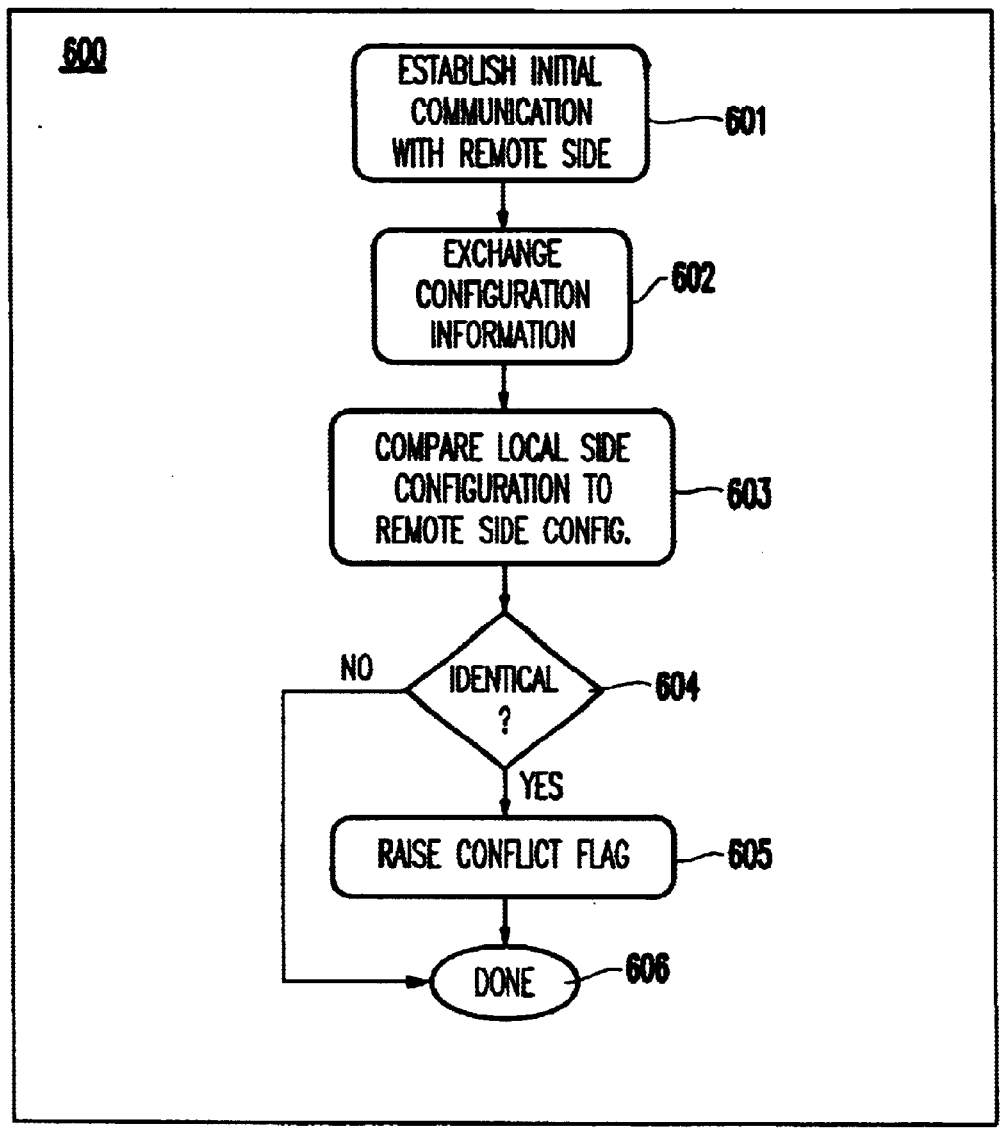
FIG. 6 illustrates a flowchart of a method 600 of conflict detection and resolution in the system of FIG. 5.
Figure 8:
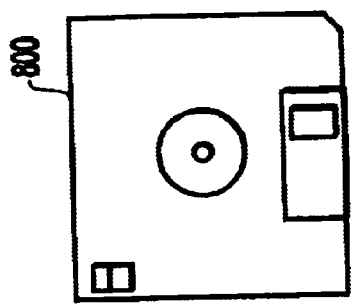
FIG. 8 illustrates a signal bearing medium 800 (e.g., storage medium) for storing steps of a program of a method according to the present invention.

Thus, as shown in FIG. 6, a configuration conflict detection and resolution method 600 is implemented to determine, upon establishing initial communication, if indeed both sides are configured for operating as the same interface. This conflict is reported through a status output pin to enable further resolution by software.

In method 600, first in step 601, initial communication is established with a remote side.

In step 602, configuration information is exchanged, and in step 603, the local side configuration is compared to the remote side configuration.

In step 604, it is determined whether the local side configuration is identical to the remote side configuration. If the determination in step 604 is "YES", then in step 605, the conflict flag is raised and the conflict detection process ends such that further resolution processing occurs. If the determination in step 604 is "NO", then the process ends, in step 606 as there is no conflict.

For the reader's further clarity, an exemplary implemented system will be described below.

That is, the exemplary system bridges two peripheral component interconnect (PCI) busses using an extended symmetric PCI-PCI bridge. In this implementation, the primary and secondary busses are PCI busses. The extended symmetric bridge implements the PCI-PCI bridge specification (e.g., see PCI-to-PCI Bridge Architecture Specification, Rev. 1.1, Dec. 18, 1998, PCI Special Interest Group at http://www.pcisig.com).

The configuration register space is the Type 1 PCI configuration registers as outlined in section 3.2, page 25 of that specification. To keep the two copies of the configuration registers in-sync, the primary PCI bus interface keeps retrying the PCI bus master that initiated the configuration transaction until the transaction has completed on the remote side of the extended bridge, before completing the transaction on the local side and acknowledging completion to the originating device.

It is noted that the present invention uses an extended bridge edge node, and more specifically uses two such nodes coupled by one (or more) serial communication channels to form a bus bridge. In a preferred embodiment, the principal bus is a peripheral component interconnect (PCI) bus (e.g., a local bus). Further, the principal bus interface logic performs functions to practice the protocol of the PCI bus.

A serial communication link interface 580, 581 has a transmit function and a receive function.

The transmit function accepts a packet of data of variable length (in parallel form), serializes data into a serial data stream, and transmits the serial data stream over one or more serial communication channel(s).

The receive function of the interface receives a serial data stream transmitted over the general communication channel (s), forms a packet of data of variable length from the received serial data stream, and outputs the packet (in parallel form).

The serial link interface 580, 581 may also perform error recovery such that the receive function monitors the serial data stream to detect errors. Upon detecting an error, the receive function controls the transmit function to communicate a message (for reception by the transmitting Bus-Bridge Edge Node) that requires retransmission of the data that caused the error.

In an exemplary embodiment, the serial communication link 580, 581 may be commercially available such as LSI's Gigablaze Transceiver core, available from LSI Logic Corp., Milpitas, Calif.

Figure 7:
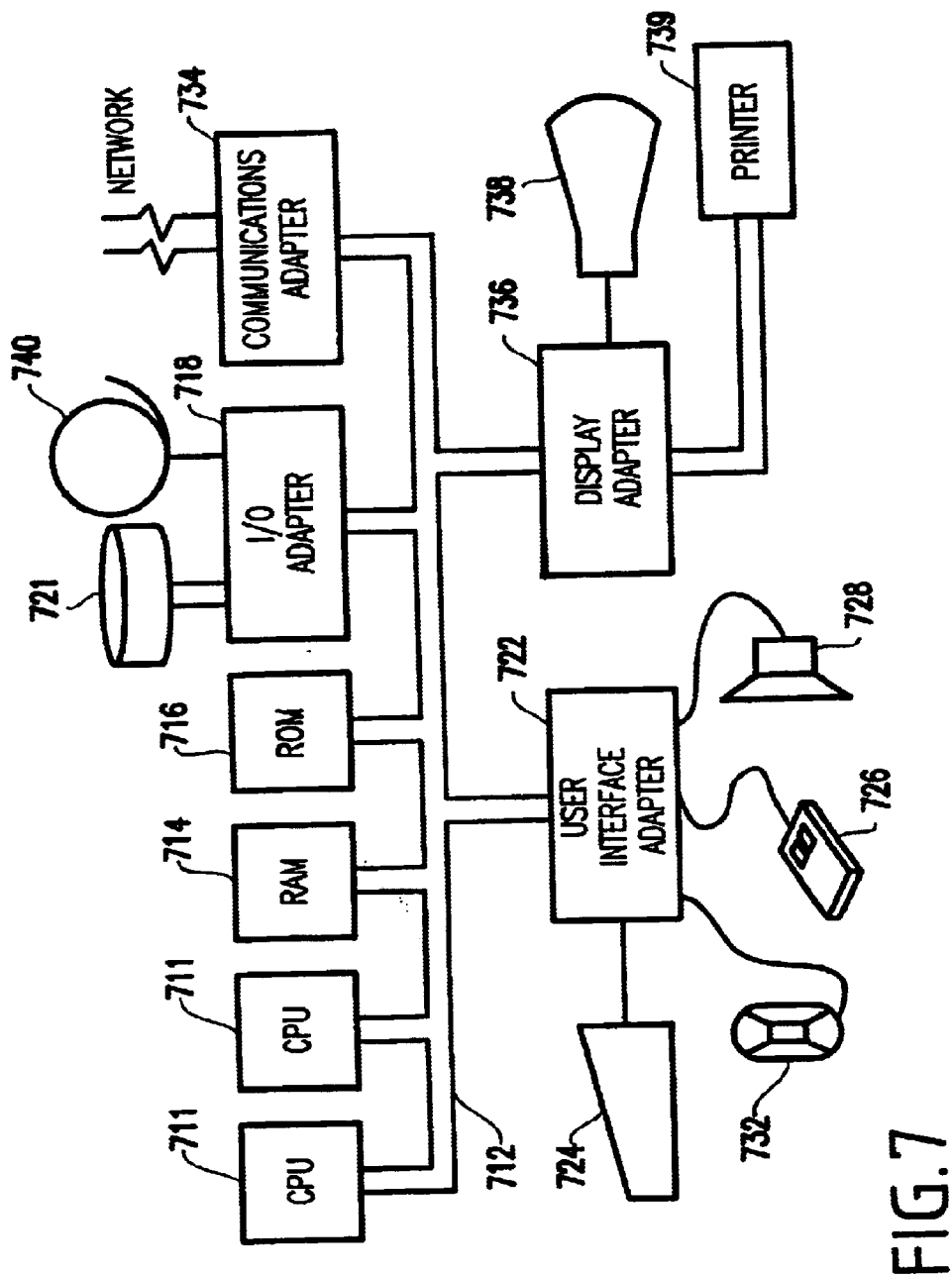
FIG. 7 illustrates an exemplary hardware/information handling system 700 for incorporating the present invention therein.

FIG. 7 illustrates a typical hardware configuration of an information handling/computer system for use with the invention and which preferably has at least one processor or central processing unit (CPU) 711.

The CPUs 711 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface device to the bus 712), a communication adapter 734 for connecting an information handling system to a data processing network, the Internet, an Intranet, a personal area network (PAN), etc., and a display adapter 736 for connecting the bus 712 to a display device 738 and/or printer 739 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

This signal-bearing media may include, for example, a RAM contained within the CPU 711, as represented by the fast-access storage for example. Alternatively, the instructions may be contained in another signal-bearing media, such as a magnetic data storage diskette 800 (FIG. 8), directly or indirectly accessible by the CPU 711.

Whether contained in the diskette 800, the computer/CPU 711, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

Thus, with the unique and unobvious aspects of the present invention, a bus bridge is provided in which the role of the primary and secondary interface can be switched under software/application control (thereby providing the symmetry).

Further, the invention allows two computer systems, each with its own controller (CPU) and peripheral devices to be coupled through the symmetric bus bridge, one computer system on each side of the bridge, such that any controller (CPU) can become the "master" of the combined system taking over the peripheral devices originally associated with the other computer system across the symmetric bridge, mapping them to its own memory or IO space while the other computer system's controller (CPU) is disabled. Furthermore, the role of the master controller (CPU) can be switched on a session-by-session basis (hence the symmetry).

While the invention has been described in terms of several preferred embodiments, those skilled in the art will recognize that the invention can be practiced with modification within the spirit and scope of the appended claims.

We claim:

1. In a system including a controller, a plurality of busses coupled to said controller, a plurality of devices coupled to said busses, and at least one bus bridge coupling at least two busses of said plurality of busses, wherein said bus bridge includes at least two interfaces each providing an interface to a different one of said at least two busses coupled thereto, and wherein said controller executes a configuration routine to configure said system, a method for initializing said bus bridge comprising:

providing a memory storing configuration information used with said configuration routine;

selecting an arbitrary one of said at least two interfaces of said bus bridge based upon a control signal such that the arbitrarily selected interface becomes a primary bus interface;

enabling access to said memory by the selected one of said at least two interfaces of said bus bridge for use with said configuration routine; and disabling access to said memory by the other one of said at least two interfaces of said bus bridge.

2. The method of claim 1, further comprising:

enabling access to said plurality of devices by the selected one of said at least two interfaces, and disabling access to said plurality of devices by the other one of said at least two interfaces of said bus bridge.

3. The method of claim 1, wherein said bus bridge comprises an extended bus bridge.

4. The method of claim 1, wherein said configuration routine is performed at power-on of said system.

5. The method of claim 4, wherein said bus bridge comprises an extended bus bridge, said method further comprising:

routing a primary chip input signal to all sub-blocks of said system and determining from its value which sub-blocks will be active on a primary side and which will be active on a secondary side, sub-blocks being common to both of said at least two interfaces being enabled regardless of a level of the primary chip input signal; and upon establishing communications between both sides of said bus bridge, performing automatic negotiation therebetween to determine a configuration set on each side.

6. The method according to claim 5, further comprising:

raising a status signal if said both sides are configured as a primary side or said both sides are configured as a secondary side, said status signal enabling further negotiation to occur to resolve roles of the two bridge sides.

7. A communications system, comprising:

first and second controllers communicatively coupled together;

a plurality of busses respectively coupled to said first and second controllers;

a plurality of devices coupled to said busses;

at least one bus bridge coupling at least two busses of said plurality of busses, said bus bridge including at least a first and second interface each providing an interface to a different one of said at least two busses of said plurality of busses coupled thereto; and a selector for selecting an arbitrary one of said first and said second interfaces of said bus bridge based upon a control signal such that the arbitrarily selected interface becomes a primary bus interface.

8. The system of claim 7, wherein said first and second controllers selectively execute a configuration routine to configure said system.

9. The system of claim 8, further comprising:

an initializer for initializing said at least one bus bridge.

10. The system of claim 9, wherein said initializer includes:

a memory for storing configuration information used in conjunction with said configuration routine.

11. The system of claim 10, wherein said initializer comprises said selector for selecting an arbitrary one of said two interfaces of said bus bridge based on a control signal.

12. The system of claim 11, wherein said initializer further comprises:

a unit for enabling access to said memory by the selected one of the two interfaces of said bus bridge for use in conjunction with said configuration routine, and disabling access to said memory by the other one of the two interfaces of said bus bridge.

13. The system of claim 8, further comprising:
a memory for storing configuration information used in conjunction with said configuration routine.

14. The system of claim 7, further comprising:
means for enabling access to a memory by the selected one of the two interfaces of said bus bridge for use with a configuration routine, and disabling access to said memory by the other one of the two interfaces of said bus bridge.

15. The system of claim 7, further comprising:
a detector for detecting any errors in each of data streams associated with said busses; and
a correction unit for correcting said any errors in said each of said data streams.

16. The system according to claim 7, wherein one of said at least two interfaces receives a control signal and the other of said at least two interfaces receives a complement of said control signal.

17. The system of claim 7, further comprising:
a conflict resolution unit for resolving conflicts between first and second interfaces of said at least two interfaces.

18. The system of claim 7, wherein said first and second controllers are coupled together via a sideband communication channel.

19. The system of claim 7, wherein said bus bridge comprises a symmetric bus bridge.

20. The system of claim 19, wherein said symmetric bus bridge includes said first and second interfaces which selectively function as said primary bus interface or as a secondary bus interface based on receipt of a control signal.

21. The system of claim 19, wherein said symmetric bus bridge includes a configurable interface which is configurable based upon a control signal, and upon receipt of said control signal said configurable interface is coupled to a configuration register to configure itself as a primary bus interface.

22. The system according to claim 20, wherein said symmetric bus bridge further comprises an inverter for providing an inverted control signal to one of said at least two interfaces, and said control signal is provided to the other of said at least two interfaces.

23. The system according to claim 19, wherein said symmetric bus bridge comprises an extended symmetric bus bridge including a communication medium between said at least two interfaces.

24. The system according to claim 19, wherein when a conflict is detected between signals issued on said first and second busses, said conflict is reported and all signals on said at least two interfaces which would be affected by said conflict are processed to avoid said conflict.

25. The system according to claim 24, wherein when a conflicting signal is observed by one of said first and second controllers, said conflicting signal operates to deactivate an output pin on which said conflicting signal would be carried.

26. The system according to claim 23, wherein said the extended symmetric bus bridge incorporates two identical copies of a configuration register space.

27. The system according to claim 26, wherein said two identical copies are kept in synchronism by writing to a remote side of said bus bridge first, and then to a local side of said bus bridge before acknowledging a configuration transaction.

28. The system according to claim 20, wherein said control signal that determines which bus interface should be the primary bus interface and which should be the secondary bus interface is split into first and second local control signals, one on each side of said bus bridge, said first and second control signals being decoupled.

29. The system according to claim 28, further comprising:
a configuration conflict detector for detecting, upon establishing initial communication, whether both sides of said bus bridge are configured for operating as the same interface.

30. The system according to claim 29, further comprising:
a configuration conflict resolution unit for resolving conflict between said two busses when said conflict is detected.

31. The system according to claim 7, wherein one of said at least two interfaces comprises a primary bus interface and the other of said at least two interfaces comprises a secondary bus interface and wherein both said primary and secondary bus interfaces are integrally formed on a same chip.

32. The system according to claim 31, wherein a primary chip input signal is routed to all sub-blocks and its value is used to determined which sub-blocks will be active on a primary side and which will be active on a secondary side, and
wherein sub-blocks that are common to both said interfaces are enabled regardless of a mode input control signal.

33. The system according to claim 32, wherein, upon establishing communications between both sides of said bus bridge, automatic negotiation occurs therebetween to determine a configuration set on each side.

34. The system according to claim 33, wherein a status signal is raised if both sides are configured as a primary side or both sides are configured as secondary side, said status signal enabling further negotiation to occur to resolve the roles of the two bridge sides.

35. The system according to claim 7, wherein a control signal is used as a mode selector on each side, and a status signal is raised when both sides are configured to be the same interface.

36. In a system including first and second controllers, a plurality of busses coupled to said first and second controllers, a plurality of devices coupled to said busses, and at least one symmetric bus bridge coupling at least first and second busses of said plurality of busses, wherein said bus bridge includes at least two interfaces each providing an interface to a different one of said first and second busses coupled thereto, and wherein said controllers selectively execute a configuration routine to configure said system, a method for resolving conflict between said first and second busses of said plurality of busses, said method comprising:
establishing initial communication between said first and second busses;
exchanging configuration information between said first and second busses;
comparing a local side configuration to a remote side configuration; and
determining whether the local side configuration is identical to said remote side configuration, and if so, then raising a conflict flag to resolve the conflict.

37. A signal-beg medium tangibly embodying a program of machine-readable instructions executable by a digital processing apparatus to perform a method of initializing a bus bridge in a communication system, said communication system including a controller, a plurality of busses coupled to said controller, a plurality of devices coupled to said busses, and at least one bus bridge coupling at least two busses of said plurality of busses, wherein said bus bridge includes at least two interfaces each providing an interface to a different one of said two busses coupled thereto, and wherein said controller executes a configuration routine to configure said system, said method comprising:

providing a memory storing configuration information used with said configuration routine;

selecting an arbitrary one of said at least two interfaces of said bus bridge based upon a control signal such that the arbitrarily selected interface becomes a primary bus interface; and enabling access to said memory by the selected one of said at least two interfaces of said bus bridge for use with said configuration routine, and disabling access to said memory by the other of said at least two interfaces of said bus bridge.

38. A signal-bearing medium tangibly embodying a program of machine-readable instructions executable by a digital processing apparatus to perform a method of resolving conflict between first and second basses of a plurality of busses in a communication system, said method comprising:

establishing initial communication between said first and second busses;

exchanging configuration information between said first and second busses;

comparing a local side configuration to a remote side configuration; and determining whether the local side configuration is identical to said remote side configuration, and: if so then raising a conflict flag to resolve the conflict.

39. A communication system, comprising:

a symmetric bus bridge; and first and second computer systems, each with its own central processing unit (CPU) and peripheral devices to be coupled through said symmetric bus bridge, such that one computer system is on each side of said symmetric bus bridge, wherein any CPU of one of said first and second computer systems can selectively become a master of said system taking over peripheral devices originally associated with the other computer system across said symmetric bus bridge, and mapping said peripheral devices to its own memory or input/output (I/O) space while the other computer system's CPU is disabled, and wherein a role of the master can be selectively switched on a session-by-session basis.

\* \* \* \* \*